(12) United States Patent
Gambino et al.

(10) Patent No.: US 10,715,472 B2
(45) Date of Patent: Jul. 14, 2020

(54) SYSTEM AND METHOD FOR UNIT-OF-ORDER ROUTING

(71) Applicant: Oracle International Corporation, Redwood Shores, CA (US)

(72) Inventors: Sal Gambino, Ringoes, NJ (US); Thomas Barnes, Whitehouse, NJ (US); Dongbo Xiao, Edison, NJ (US); Shean Guang Chang, Morris Plains, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 102 days.

(21) Appl. No.: 16/027,616

(22) Filed: Jul. 5, 2018

(65) Prior Publication Data

US 2019/0068536 A1 Feb. 28, 2019

Related U.S. Application Data

(60) Provisional application No. 62/548,875, filed on Aug. 22, 2017.

(51) Int. Cl.
*H04L 12/58* (2006.01)
*H04L 29/08* (2006.01)
*H04L 29/06* (2006.01)

(52) U.S. Cl.
CPC .......... *H04L 51/18* (2013.01); *H04L 65/1063* (2013.01); *H04L 67/10* (2013.01); *H04L 67/02* (2013.01); *H04L 67/1097* (2013.01); *H04L 67/2842* (2013.01); *H04L 69/329* (2013.01)

(58) Field of Classification Search
CPC ..... H04L 51/18; H04L 65/1063; H04L 67/10; H04L 69/329; H04L 67/2842; H04L 67/02; H04L 67/1097
See application file for complete search history.

(56) References Cited

U.S. PATENT DOCUMENTS

| | | |
|---|---|---|
| 2002/0184312 A1 | 12/2002 | Chen |
| 2004/0215725 A1 | 10/2004 | Love |
| 2005/0216585 A1 | 9/2005 | Todorova |
| 2007/0044144 A1 | 2/2007 | Knouse |
| 2014/0006626 A1 | 1/2014 | Breiter |
| 2014/0189681 A1 | 7/2014 | Bryan |

(Continued)

OTHER PUBLICATIONS

Pei, Yuanteng (Jeff), "REST Commander: Scalable Web Server Management and Monitoring", Mar. 11, 2014, 3 pages. Retrieved on Sep. 12, 2017 from http://ebaytechblog.com/2014/03/11/rest-commander-scalable-web-server-management-and-monitoring/.

(Continued)

*Primary Examiner* — Michael A Keller
(74) *Attorney, Agent, or Firm* — Tucker Ellis LLP

(57) ABSTRACT

In accordance with an embodiment, a system and method provides a messaging service implementing a unit-of-order guarantee in a multitenant application server environment. The system and method of implementing unit-of-order utilizes an improved path service for routing all messages having a particular unit-of-order to the same member of the cluster. The improved path service allows for scalability of the cluster and reduced resource utilization, thereby improving the performance of a clustered computing system providing the messaging service.

20 Claims, 10 Drawing Sheets

(56) References Cited

U.S. PATENT DOCUMENTS

2014/0201242 A1    7/2014  Bakthavachalam
2014/0344709 A1*  11/2014  Roberts ............... H04L 12/1859
                                                      715/752
2016/0094625 A1*  3/2016  Sengodan ............... H04L 67/10
                                                      709/204

OTHER PUBLICATIONS

McCool, Michael, "Parallel Pattern 7: Reduce", Dec. 4, 2009, 3 pages. Retrieved on Sep. 12, 2017 from http://www.drdobbs.com/architecture-and-design/parallel-pattern-7-reduce/222000718.

Cozzi, Patrick, "Parallel Algorithms", University of Pennsylvania, Spring 2012, 21 pages. Retrieved on Sep. 12, 2017 from http://cis565-spring-2012.github.io/lectures/02-01-Parallel-Algorithms.pdf.

"Oracle® Fusion Middleware Administering WebLogic Server for Oracle Exalogic Elastic Cloud 12c (12.1.3)", Oracle, Jul. 2014, 50 pages.

"Oracle® Fusion Middleware Administering WebLogic Server for Oracle Exalogic Elastic Cloud 12c (12.1.3)"; Chapter 3: "Using the WebLogic Replicated Store for WebLogic Server Messaging Services", downloaded from https://docs.oracle.com/middleware/1213/wls/WLEXA/rs.htm on Dec. 3, 2014, 19 pages.

"Oracle® Fusion Middleware Administering Server Environments for Oracle WebLogic Server 12.1.3", Oracle, Aug. 2015, 98 pages.

"Oracle® Fusion Middleware Administering Server Environments for Oracle WebLogic Server 12.1.3"; Chapter 6: "Using the WebLogic Persistent Store", downloaded from https://docs.oracle.com/middleware/1213/wls/CNFGD/store.htm on Dec. 3, 2014, 30 pages.

"Oracle WebLogic Server 12.1.3 is Released", Will Lyons, Jun. 26, 2014, downloaded from https://blogs.oracle.com/WebLogicServer/entry/oracle_weblogic_server on Dec. 3, 2014, 2 pages.

"Oracle Cloud Control Help for WebLogic Server 12c (12.1.3): Create Replicated Stores", downloaded from https://docs.oracle.com/middleware/1213/wls/WLACH/taskhelp/stores/ on Dec. 3, 2014, 2 pages.

"Block (data storage)", downloaded from https://en.wikipedia.org/wiki/Block_(data_storage) on Jun. 2, 2016, 1 page.

* cited by examiner

SYSTEM AND METHOD FOR UNIT-OF-ORDER ROUTING

CLAIM OF PRIORITY

This application claims the benefit of priority to U.S. Provisional Application titled "SYSTEM AND METHOD FOR UNIT-OF-ORDER ROUTING", Application No. 62/548,875, filed Aug. 22, 2017 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to messaging services, and particularly related to systems and methods for routing messages to a messaging service cluster.

BACKGROUND

Software application servers, examples of which include Oracle WebLogic Server (WLS) and GlassFish, generally provide a managed environment for running enterprise software applications. Recently, technologies have also been developed for use in cloud environments, which allow users or tenants to develop and run their applications within the cloud environment, and to take advantage of distributed resources provided by the environment.

Messaging services, for example, Java Message Service (JMS), can provide an application programming interface (API) that is usable in application server environments for sending messages between two or more clients.

JMS is a messaging standard that allows application components to create, send, receive, and read messages, allowing communication between different components of a distributed application to be loosely coupled, reliable, and asynchronous.

JMS can provide a unit-of-order extension that enables messages to be grouped into a unit-of-order (UOO). Messages with the same unit-of-order are required to be processed (consumed) in the same order in which they are submitted (produced). In a clustered environment honoring the unit-of-order, guarantee of ordered processing is enabled by routing all messages having a particular UOO name to the same member of in a JMS cluster. To achieve this, it is necessary to have a system for routing messages to the appropriate member of the cluster. One way to achieve the above routing effect is maintaining an in-memory map with a routing entry for each UOO, and persisting each routing entry to a persistence store.

However, for a dynamic JMS cluster, maintaining an in-memory map for each UOO can be problematic. For example, for routes recorded before the JMS cluster grows due to an elasticity decision, UOO messages using the routes can remain concentrated on the original running members and never be rebalanced to new members in the JMS cluster. Thus, additional cluster resources are not fully utilized.

Further, the in-memory map can use too much memory tracking each UOO individually when there is a large number of UOOs.

Furthermore, routing persisting can costly in terms of performance. Each new UOO requires at least one interaction with a persistence store, and a persisting operation, which increases the cost of messaging and causes performance issues.

Accordingly prior systems and methods for routing messages in a JMS cluster while satisfying UOO suffer from problems including poor resource utilization, poor scalability and high overhead. It would therefore be desirable to provide a system and method for routing messages in a JMS cluster which overcomes the problems of the prior art and improves the resource utilization and scalability while reducing overhead.

SUMMARY

In accordance with an embodiment, described herein is a system and method for providing a messaging service in an application server environment. In accordance with an embodiment, the present disclosure describes an improved system and method for implementing unit-of-order (UOO) in a messaging service operating in a clustered environment such as clustered application server environment. Messages with the same unit-of-order are required to be processed (consumed) in the same order in which they are submitted (produced). In a clustered environment honoring the unit-of-order guarantee is enabled by transmitting all messages having a particular UOO to the same member of the cluster. The system and method of implementing unit-of-order utilizes an improved path service for routing all messages having a particular UOO to the same member of the cluster. The improved path service allows for scalability of the cluster and reduced resource utilization, thereby improving the performance of a clustered computing system providing the messaging service.

In accordance with an embodiment, the system and method can be used to provide a unit-of-order (UOO) message routing in a dynamic messaging service cluster. A singleton path service can create a first routing table for the cluster, and a second routing table after the cluster is scaled up (or scaled down). Each routing table has a fixed size, and includes a route for each value derived from a modulo operation applied to a hash of each UOO string over a member count of the cluster.

The first routing table is used to route messages before the scaling-up (or scaling down), and the second routing tables is used to route messages after the scaling-up (or scaling down). If messages in a UOO are routed to a first member and a second member due to the use of different routing tables, the singleton path service pauses message consumption at the second member until message consumption at the first member is completed. This ensures the UOO is processed (consumed) in order even during rebalancing from one member to another member. The first routing table can be deleted when all messages routed using the first routing table are consumed. Accordingly the first and second routing tables only exist concurrently during a transition period which allows for consumption of all messages routed using the first routing table.

In accordance with an embodiment, each route in a routing table can be information (e.g., member number, member name, member ID, IP address, or URL) of a member in the cluster. Either the first routing table or the second routing table can be an in-memory map including values derived from a modulo operation and their associated routes.

In accordance with an embodiment, each value can be calculated using the formula "UOO.hash % X", where UOO.hash is the hash of a UOO string, and X is the number of total members in a cluster. The number of total members in the cluster can be dynamically calculated.

Given a hash function, the hash for a particular string does not change, different strings have different hashes which are relatively randomly distributed among the different strings, and X does not change when a cluster is in a steady state or after the cluster is updated with new members.

As such, when the cluster is in a steady state (e.g., no growth, shrinks or failures in the cluster), UOOs can be relatively evenly distributed across the members in the cluster, which solves the routing imbalance problem discussed above.

Further, using a modulo operation, the system can reduce a plurality of UOO string to the same value, so that the number of routes can be limited to a fixed number of members in the cluster, thereby reducing memory usage. By persisting each route only once, overhead for persisting routes can also be reduced.

These and other objects and advantages of the present invention will become apparent to those skilled in the art from the following description of the various embodiments, when read in light of the accompanying drawings.

DETAILED DESCRIPTION

Figure 1:
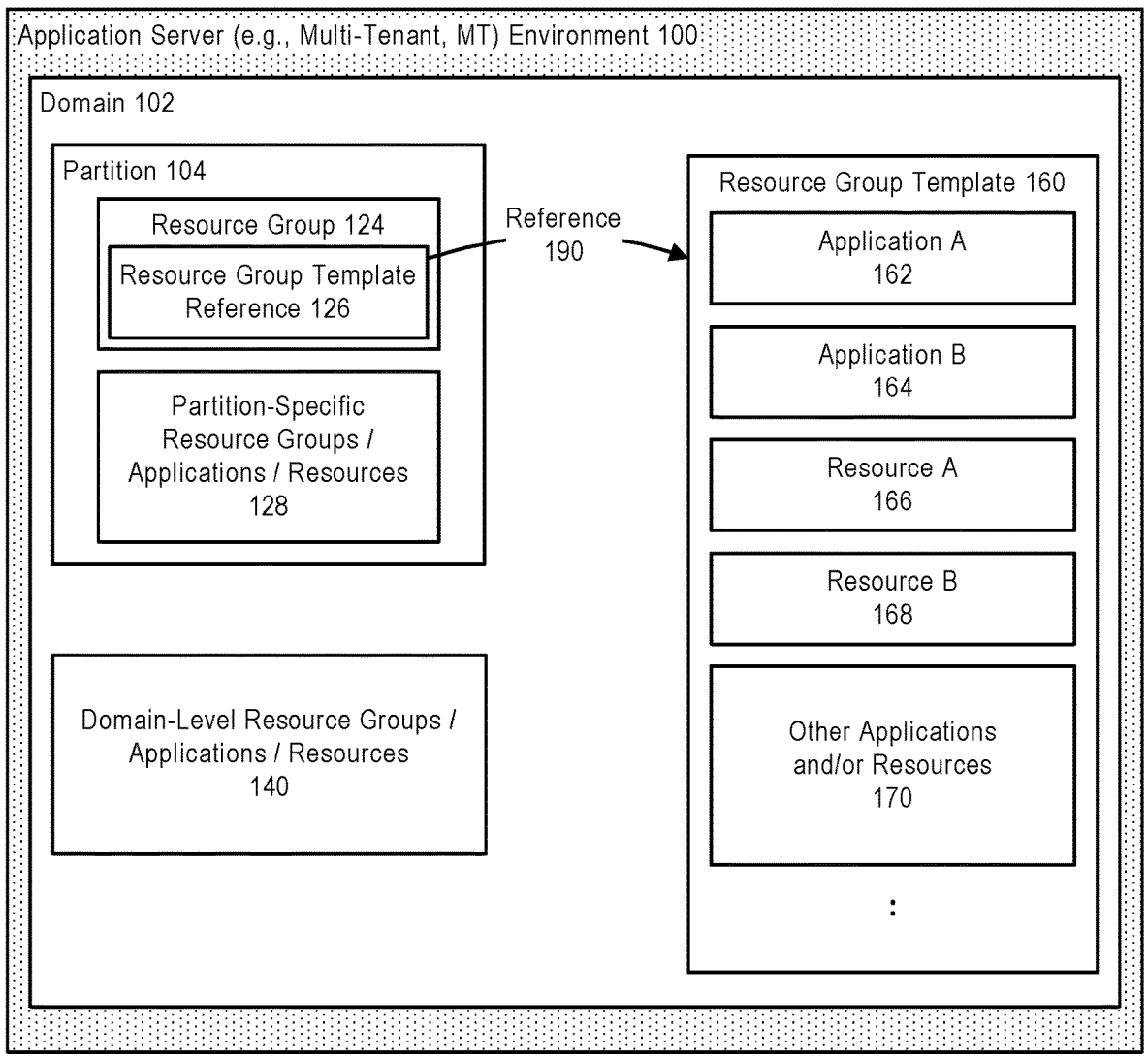
FIG. 1 illustrates a system for supporting multi-tenancy in an application server, cloud, or other environment, in accordance with an embodiment.

In accordance with an embodiment, described herein is a system and method for supporting messaging services in a clustered environment. In accordance with an embodiment, the present disclosure describes an improved system and method for implementing unit-of-order (UOO) in a messaging service operating in a clustered environment. In a cluster, JMS components typically reside on different servers within that cluster, and can work together to enable communication between applications executing on the different servers, as well as between applications executing on different clusters within a partition.

In the following description, the invention will be illustrated, by way of example and not by way of limitation, in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. Functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Application Server (e.g., Multi-Tenant, MT) Environment

The present system and method for UOO routing is of particular utility in an application server environment which may be a single tenant or multi-tenant application server environment. For example, the system and method can be used to provide a unit-of-order (UOO) message routing in a dynamic messaging service cluster of a single tenant or multi-tenant application server environment. FIG. 1-6 illustrates a system for supporting multi-tenancy in an application server, cloud, or other environment as an example of a system in which the present system and method for UOO routing may be implemented. However, the system and method for UOO routing may be implemented in a wide range of application server environments where the described properties and advantages (particularly with respect to scalability) are necessary or desired.

As illustrated in FIG. 1, an application server (e.g., multi-tenant, MT) environment 100, or other computing environment which enables the deployment and execution of software applications, can be configured to include and operate according to a domain 102 configuration that is used at runtime to define an application server domain.

The application server can include one or more partitions 104 that are defined for use at runtime. Each partition can be associated with a globally unique partition identifier (ID)

and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
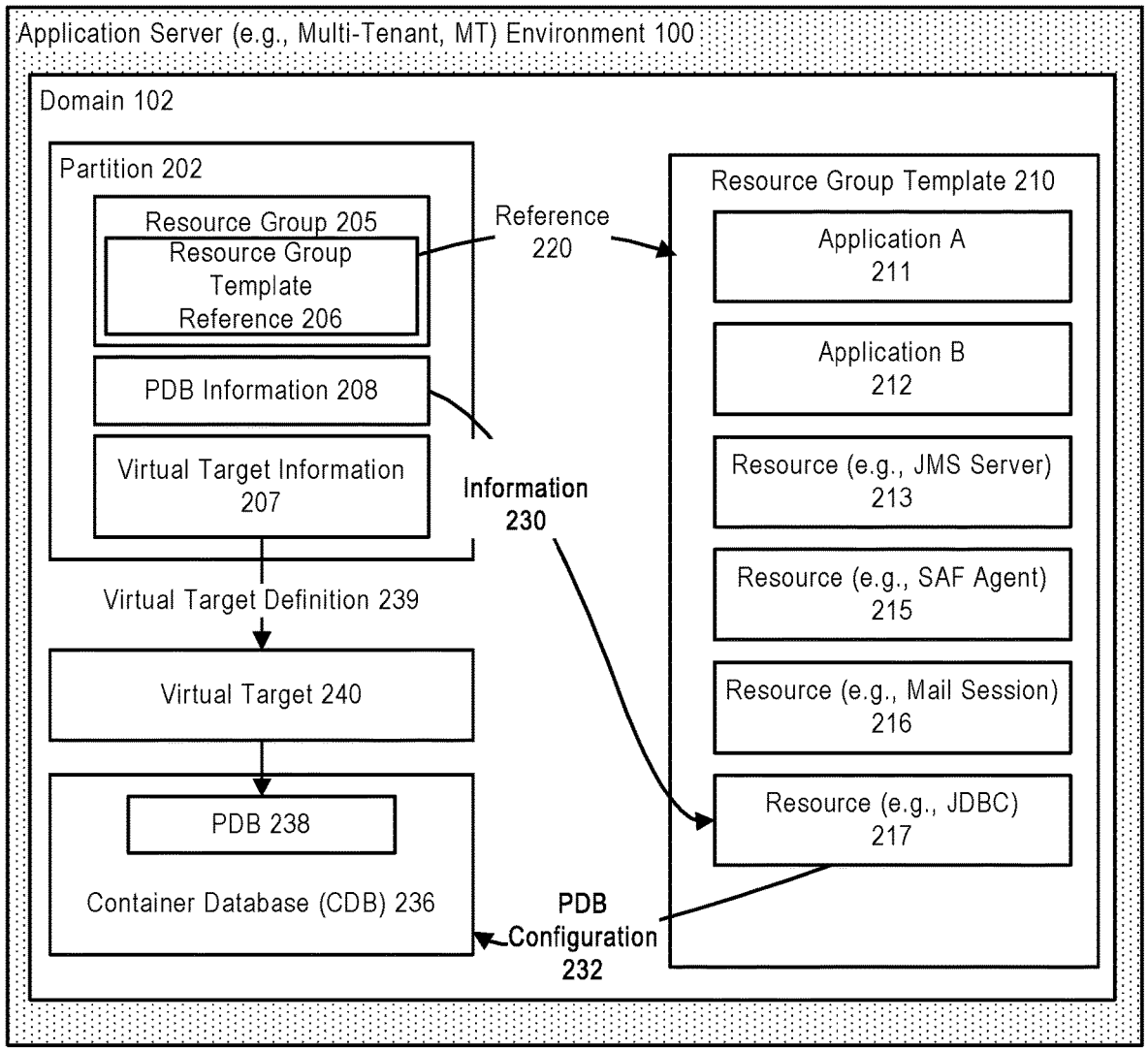
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment. As illustrated in FIG. 2, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217. The resource group template illustrated in FIG. 2 is provided by way of example; in accordance with other embodiments, different types of resource group templates and elements can be provided.

When resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition. Further, foreign JMS server overrides contain property key values that can provide overrides for resource group templates.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
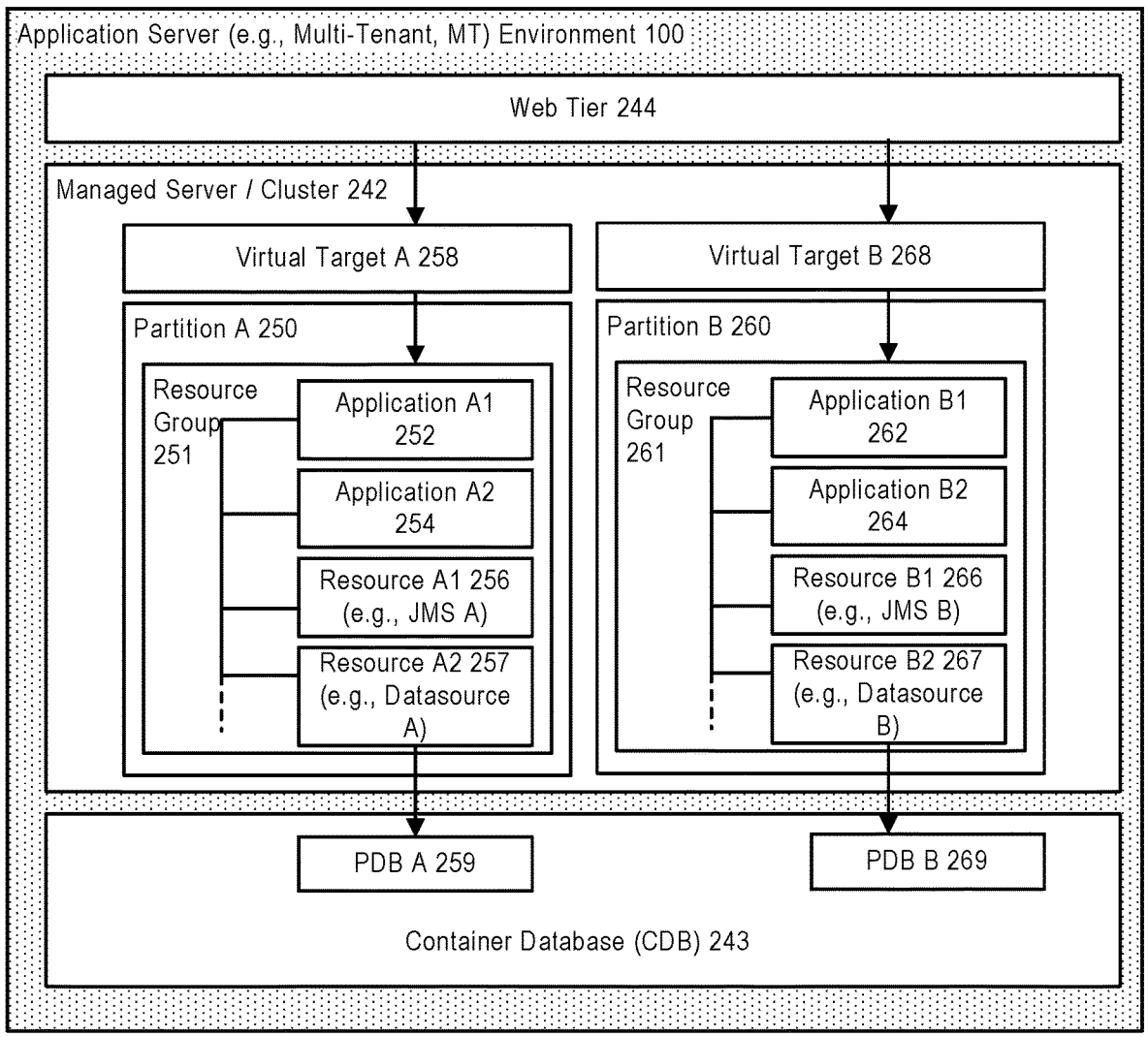
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment. A system configuration such as a config.xml configuration file, is used to define a partition, including configuration elements for resource groups associated with that partition, and/or other partition properties. Values can be specified per-partition using property name/value pairs.

A plurality of partitions can be executed within a managed server/cluster 242, or a similar environment which can provide access to a CDB 243, and which are accessible via a web tier 244. This allows, for example, a domain or partition to be associated with one or more of the PDBs (of the CDB). Each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

A resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

A partition is a runtime and administrative subdivision or slice of a domain that can be associated with a partition identifier (ID) and configuration, and can contain applications and/or refer to domain-wide resources through the use of resource groups and resource group templates. Upon startup, the system can use the information provided by the configuration file to generate partition-specific configuration elements for each resource, from the resource group template.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

A resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend.

In a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Figure 4:
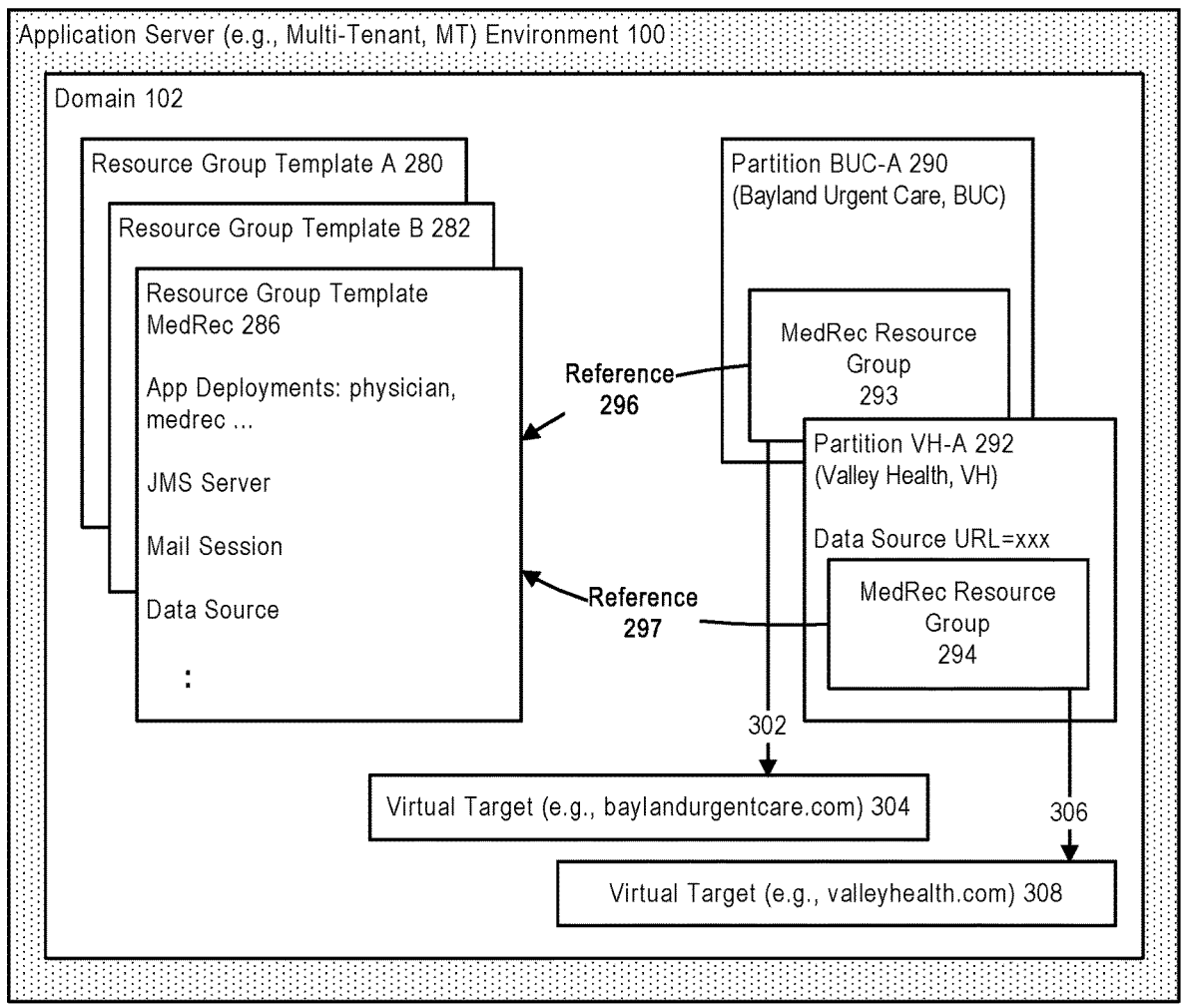
FIG. 4 illustrates an exemplary use of resource group templates, in accordance with an embodiment.

Applications can be deployed to a resource group template at the domain level, or to a resource group that is scoped to a partition or scoped to the domain. Application configuration can be overridden using deployment plans specified per-application, or per-partition. Deployment plans can also be specified as part of a resource group. FIG. 4 illustrates a domain configuration for use with an exemplary multi-tenant environment.

When the system starts a partition, it creates virtual targets (e.g., virtual hosts) and connection pools, including one for each partition, to respective database instances, according to the provided configuration. Typically, each resource group template includes one or more related applications and the resources on which those applications depend. Each partition provides configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition contains resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
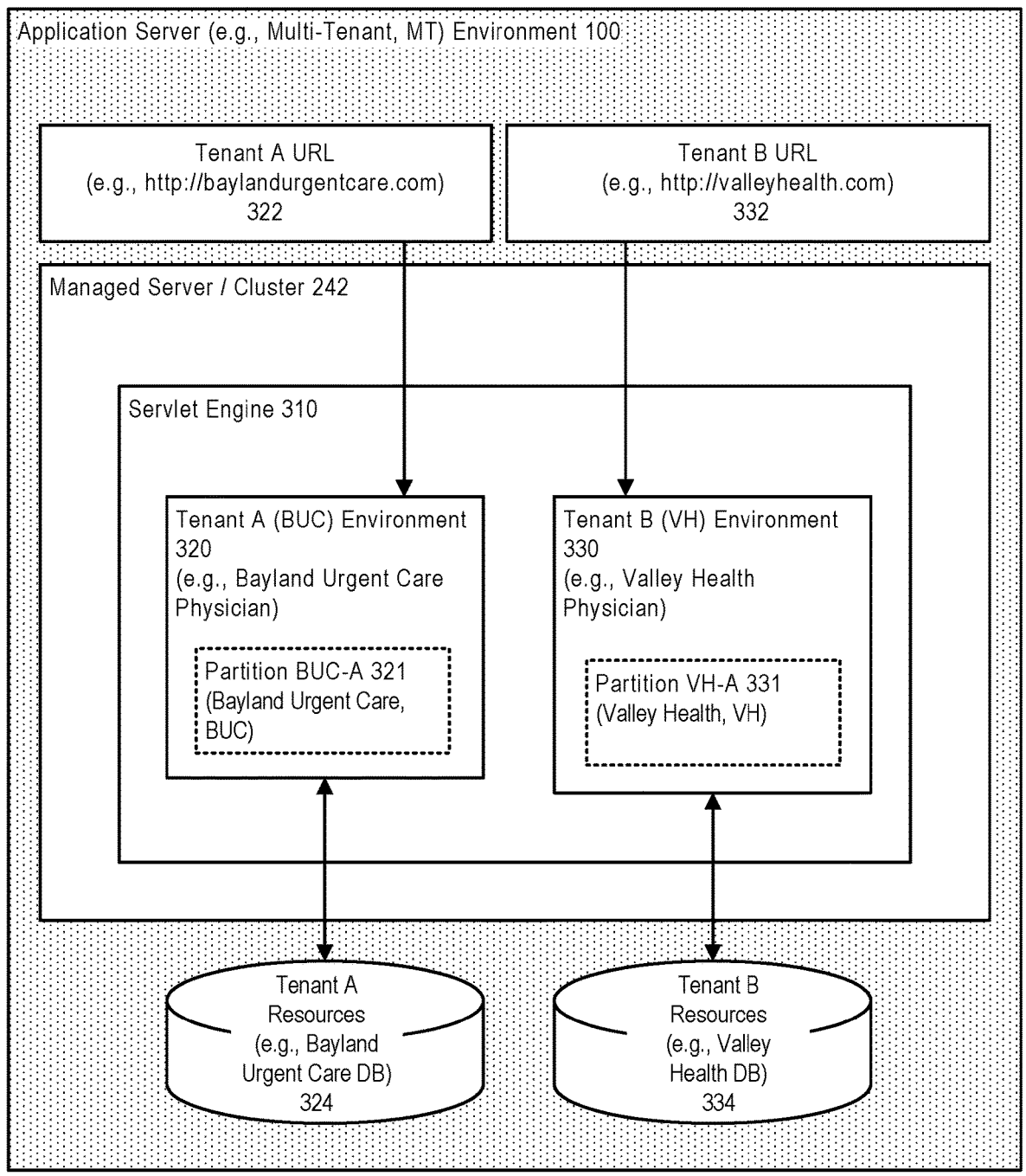
FIG. 5 illustrates an exemplary multi-tenant environment, in accordance with an embodiment.

FIG. 5 further illustrates an exemplary multi-tenant environment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a Bayland urgent care database, or a valley health database respectively. The database instances can use compatible schemas, since the same application code will execute against both databases. When the system starts the partitions, it can create the virtual targets and connection pools to the respective database instances.

A system and method is provided for implementing a messaging service that can support cluster targeting in a partitionable, multi-tenant environment for operating software applications. Messaging services will be described hereinafter in the context of Java Message Service (JMS), including exemplary deployments, features and configurations of JMS. However, one skilled in the art will appreciate that the description of JMS is merely exemplary, that JMS is merely one type of messaging service and that embodiments are intended to be applicable to any messaging service usable within a partitionable environment for operating software applications. Further, one skilled in the art will appreciate that a messaging service is merely one type of service, and that embodiments are intended to be applicable to other services, such as a transaction manager, usable within a partitionable environment for operating software applications. In particular embodiments JMS utilizes the enhanced UOO system and method described herein.

JMS services comprise core JMS components including JMS servers, JMS system modules, JMS application modules, JMS Java clients, C clients and .NET clients, public helper APIs, and path services. JMS services further comprise internal components such as a dispatcher, front-end, back-end and messaging kernel. Further, store-and-forward (SAF) services comprise agents for both JMS SAF and the web services reliable messaging (WSRM) for WebLogic Java API for XML-based remote procedure call (JAX-RPC) web services implementation, and messaging integration comprises integration components for arbitrary JMS providers including messaging bridges, JMS pools, and foreign JMS servers.

Figure 6:
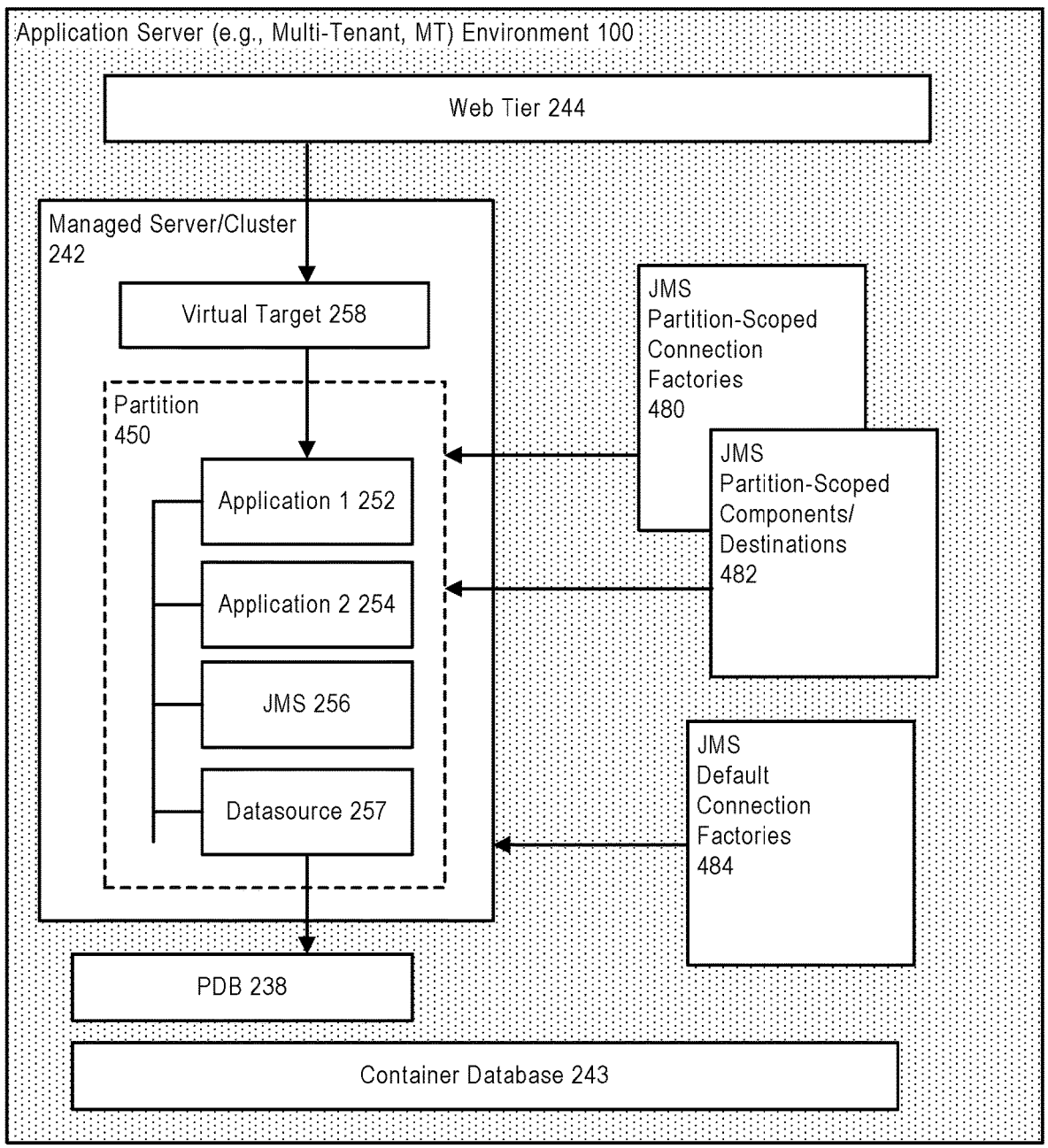
FIG. 6 illustrates messaging in a multitenant application server environment, in accordance with an embodiment.

FIG. 6 illustrates messaging in a multitenant application server environment. JMS messaging components 480, 482 for use in a partitionable, multi-tenant environment, including JMS servers, path services, SAF agents, messaging bridges, JMS foreign server, JMS system modules, and JMS application modules, can be deployed in a partition through resource groups and resource group templates. JMS wrapper/pools can be referenced by an application (e.g., a Java EE application) within a partition using resource references. Partitions can be isolated with respect to one another if a resource group template is referenced by partitions on multiple clusters.

JMS resources can be defined within a resource group template or a resource group and instantiated within a partition to support SaaS and consolidation use cases. JMS components are partition scoped, exist in an isolated JNDI name-space, use partition scoped runtime/configuration MBeans and use isolated persistent storage. JMS connection factories and their child resources are associated with the partition for which they are configured. Default connection factories 484 are deployable to the domain and are available to applications within partitions. Default connection factories are scoped (isolated) to the domain level or to their partitions. They are not directly shared across partitions except that all custom factories (custom and default) are available across partitions using the "domain:" and "partition:" JNDI name prefix, or using URL locators that resolve to the different location.

In accordance with an embodiment, the operations, administration and management (OA&M) service automatically decorates configuration and deployment MBean names with their local partition name, or provides a mechanism for JMS components to do so. The core OA&M, deployment, networking, security and diagnostics services are partition aware by default. For example, when a logger logs a message, the partition ID of the current thread will show in a supplemental attribute of a log message unless the log message is specifically marked as "exclude_partitioned". Core service callbacks, including OA&M, JNDI, diagnostics, and deployment service callbacks, include the local partition ID on the callback thread.

Work manager instances, once created, are associated with a particular partition and run jobs with the partition ID of that partition on the execute thread. If a work manager name exists at the domain level, a findOrCreateWorkManager( ) call from a partition context does not return the global work manager with that name if a local work manager with that name does not exist. Rather, a partition-scoped work manager with that name is created. A timer manager delegates partition association to the work manager instance that is associated with the timer manager.

Enterprise Javabeans (EJBs), servlets, and message driven beans (MDBs) are fully partitioned. For example, a particular instantiated partition scoped MDB or EJB bean will have the partition ID of its host partition on the current thread.

Data sources and WebLogic remote method invocation (RMI) and/or EJB smart stubs, including JMS connection factory stubs, are associated with the partition from which they are obtained, and do not change their partition based on the current partition on the current thread. APIs are provided for obtaining the partition ID of the current thread, for overriding the partition ID of the current thread with a different partition ID and for obtaining the partition of a smart stub.

A client or partition is able to communicate with one or more destinations on multiple partitions within the same cluster, within different clusters, or within different domains, and can interoperate with previous versions of application servers (e.g., WebLogic servers) that are not executing within partitioned environments. For example, old clients are able to send messages to a particular partition, and a partitioned application will be able to send messages to an application server that is executing in a non-partitioned environment.

Domain level JMS resource configurations, JMS system resources and JMS modules embedded in deployable modules are supported at the domain level for applications built for non-partitionable or legacy environments. As mentioned above, in accordance with an embodiment, JMS resources are available for applications for use in partitionable, multi-tenant environments at the partition level via resource group templates or resource groups. JMS resources, such as connection factories, destinations, message bridges and path services are partition scoped, with each resource either belonging to the domain or a particular partition. A resource can exist in multiple partitions with the same JNDI name. An application that uses the correct URL when it creates an initial context to the domain or partition will access the correct resources via JNDI lookup operations.

Persistent application data that a JMS component holds are stored in persistent storage, such as a file store, replicated store or JDBC store. Each partition includes an instance of a file store and replicated store so that the data are in different locations in the file system if configured properly, and JMS applications can achieve isolation of application data, system resources, as well as security, between partitions. Each partition can choose to use a different PDB instance in the same database when using a JDBC store.

A JMS component ensures that system resources, such as threads and memory, are accounted for under the right partition. The JMS component replies on some of the core services to provide object-based partition association.

Core messaging components include JMS servers, SAF agents, and path services. A JMS server can include, for example, a WebLogic server service that provides messaging capability via Java EE standard interfaces and additional WebLogic extensions. A SAF agent can provide a store-and-forward service to WebLogic JMS. A path service is a singleton service in a cluster that provides persistent routing data for JMS server and SAF agent distributed destination members. Each partition includes a path service in each cluster and an MBean legal check prevents a path service from being configured in more than one resource group in a partition in the same cluster.

The core messaging components are deployable in a partition via resource groups and resource group templates, and inherit the target of the resource group and partition to which they belong. An exception is thrown if a resource within a resource group has its own target. For non-partitionable environments, or other legacy configurations, configuration entities are directly targeted to a server, a cluster, or a migratable target. In accordance with an embodiment, a migration tool can be used to null out the targeting of existing resources when migrating the resources to a partitionable, multi-tenant environment, for example from a non-partitionable environment (e.g., a legacy environment).

A cloned instance of a resource includes a name that is automatically decorated with the local partition name. Instance names can be generated based on configuration MBean names, which are automatically decorated with the current partition name by the OA&M service. Cluster targeted JMS server and SAF agent names embed the name of an application server (e.g., a WebLogic server). For further disambiguation some internal artifacts, such as XA resources, are decorated with the current domain name.

Messaging includes separate configuration modules that can be targeted at clusters or individual servers, and optionally associated with particular JMS servers and SAF agents within this targeting scope via sub-deployments. There are two types of modules: system modules which can be referenced from the config.xml file of a domain and configured via MBeans and console, and application modules which can be embedded within an application.

JMS module artifacts, such as JMS connection factories, JMS server distributed and singleton destinations, SAF agent imported destinations, and foreign JMS server references, can be configured at a global level as well as at a partition level. Once configured within a partition, the JNDI names for the module artifacts are registered in the JNDI namespace that corresponds to the partition of the JMS module. In accordance with an embodiment, the namespace for system modules is the global JNDI namespace, while the JNDI namespace for application modules is the JNDI name space of the component. The sub-deployment targets of a JMS module are in the same partition as the JMS module itself.

A Java EE application, such as a message driven bean (MDB), deployed in a partition can access domain level JMS resources, or partition level JMS resources in the same partition or in a different partition in the same cluster, a different cluster or a different domain generally via JNDI. JMS resources at the domain level and partition level are isolated from each other even if they have the same name.

A physical JMS system module file is referenced by one resource group template in one domain. Similarly, for the non-templated consolidation use case, a physical JMS system module file is referenced by one resource group.

In accordance with an embodiment, internal OA&M configuration MBeans for these resources may have names that are automatically decorated with partition names by the OA&M component, but in general, public configuration MBeans are not so decorated. Regardless, the entity names are unique within their scope within a server when the configuration callbacks get into the JMS layer. In some embodiment, partition information is stripped from the name of a JMS runtime MBean that derives its name from the name of an internal configuration MBean that has name decoration.

Some module artifacts can include configurable attributes, including credentials and URLs, customized on a per partition basis. Per-partition customization can be achieved by a macro substitution mechanism available via partition properties for artifacts within a resource group template and does not apply to configurable artifacts in a JMS module file that is referenced from a JMS-system-resource or an add-deployment in the resource group template. Per partition customization can also be achieved by an MBean that handles customization of PDB configurations. Per partition customization can also be achieved by an application deployment plan that overrides some of the application deployment settings, for example via an MBean mechanism. Per partition customization can also be achieved via foreign JMS server overrides which contain property key values that can provide overrides for resource group templates.

Default connection factories can be enabled and disabled on a per server basis. Once enabled on an application server (e.g., a WebLogic server) default connection factories are available in all partitions running on that application server. Once disabled, the default connection factories are not available in any partitions on the server.

Messaging provides asynchronous communication between application components. Communication can cross the boundary of partitions on the same cluster, different clusters and even different domains. An arbitrary messaging thin Internet Inter-ORB Protocol (110P) client, thin T3 client, thick/full Java client or non-partitioned server-hosted application client is able to access a partition-scoped JMS resource that is on a remote application server (e.g., WebLogic server). In addition a server-side application from one partition can access JMS resources of another partition on the same server, same cluster, and same domain.

JMS client connections can be permanently associated with the partition from which they obtain their connection factory, and do not change their partition based on what is on the current thread. When JMS pushes messages or exceptions to an asynch listener, the local partition ID of the listener will be resumed, rather than the partition of the destination.

In accordance with an embodiment, a JMS application is able to access a JMS resource that is running in a different JVM or cluster via the WebLogic T3 protocol. The application needs to supply a partition URL besides a JNDI provider URL which establishes the initial context. For example, the application can supply a partition URL such as (1) t3://virtualhostname:port, which requires configuring virtual hosts, (2) t3://host:portURl, where the URI is often configured to be the same as the partition-name, or (3) via t3://host:port, where the port has been dedicated for use by a specific partition. A virtual host need not be configured to support the latter two methods.

For interoperability, an application that is not designed for running in a partitionable, multi-tenant environment is able to access a JMS resource in a partition by using method (3). Further, a JMS application in one partition or at the domain level is able to access a JMS resource in a different partition that is running on the same JVM without requiring the provider URL.

A partitionable, multi-tenant environment can support partition migration from one cluster to another cluster. As described above with respect to JMS stores, partition migration is problematic in general for messaging component state as application data may be trapped in an old location. In order to avoid data loss, application messages can be required to be completely drained and all pending transactions completed before undeploying or removing a JMS server or SAF Agent.

Resource group migration from one cluster to another within a partition is supported for AQ JMS, as AQ JMS generally doesn't have singleton data that's tied to a cluster. AQ JMS supports resource group multi-targeting, resource group data migration and JNDI bind/unbind, and partially supports client transparency.

Resource multi-targeting is a resource group migration feature that allows a resource group to temporarily run concurrently in two clusters. Resource group data migration stores messages in the database in a central location accessible from either cluster that participates in a resource group migration. JNDI bind/unbind support provides that when a resource group bootstraps, its foreign JMS mappings are bound into its partition's name-space in the current cluster. When a resource group migrates away from a cluster, any of its foreign JMS mappings will be unbound from JNDI.

Client transparency is partially supported in that during a migration, server side applications may generate exceptions and log messages depending on the nature of the application and the order that applications and services are shutdown. Java SE AQ JMS clients will get exceptions on an attempt to use a WebLogic JNDI context connected a server that's been cycled for zero down time—and will need to recreate their JNDI context.

In a partitionable, multi-tenant environment, JMS uses an object-based partition model rather than a thread-based partition ID association model alone because some JMS features require one thread to work with different application resources that are potentially in different partitions, clusters and even domains. For example, a messaging bridge may receive messages from a destination in one partition and forward them to a destination in another domain. Unless the partition ID is associated with JNDI context and JMS connection object-based, the messaging bridge has to switch partition ID on a per call basis. Further, it is common that a JMS application may cache a JMS object and uses it in a thread that is different from the one that establishes the initial context. As result, JMS connection factories that are obtained from a particular partition remain permanently associated with that partition regardless of the partition ID that is on the current thread.

JNDI initial contexts use a thread-based partition ID pattern, yet messaging internals, messaging applications, and even non-message applications very likely need them to use an object-based partition ID association approach similar to the one used for messaging. For example, when a context is created for a virtual host or a URL with a partition name, the context object should remember the partition ID so that all subsequent lookups and bindings are done within the context of the partition. This stickiness needs to remain even if the context is used by a different thread than was used to create the context.

In addition, context creation should not change the partition ID of the current thread. An object-based initial context can simplify messaging internals, and can ensure that customer applications that directly use contexts for messaging and non-messaging purposes will work correctly when multi-threading or when attempting cross-partition communication. This eliminates the need for clients and internal code to manually ensure that the right partition is on a thread that happens to work with more than IC to more than one partition. It can also eliminates the need for clients to move a partition from thread to thread even when it works with a single IC, otherwise the lookup may mistakenly use a null or a local partition that is on the current thread).

Loggers can be provided with an object-based partition ID option. This can reduce the need to push/pop a partition ID in messaging paths that are associated with a particular partition, but may be called using threads from multiple different partitions.

In a non-partitionable environment or legacy system, multiple types of stores are used, including, for example, file stores, JDBC stores and replicated stores. Each application server includes one default file store used by the messaging components as well as non-messaging components including JTA and EJB Timers. JMS servers, SAF agents, and path services can use either custom configured stores or a default file store to persist state.

In accordance with an embodiment, in a partitionable, multi-tenant environment does not include a default store for each partition, and in order to ensure that data is fully isolated, partitioned services including JMS services are prevented from using a domain scoped default store.

Custom stores are defined within a resource group template or a resource group and instantiated within a partition. Typically, a system administrator configures store components within a resource group template and a partition administrator is given permission to configure store components within a resource group. MBean legal checks require that partitioned JMS components are configured to reference a custom store from their local resource group. Store components are fully partition scoped and use partition scoped runtime MBeans and configuration MBeans. Import and export of partitioned file store data is prevented, as is migration of file store data from one cluster to another.

There can be multiple custom configured stores per application server or cluster. Custom configured stores are separately configured and targeted, and can be targeted to an application server (e.g., a WebLogic Server), a migratable target, or a cluster. A custom configured store can be used by JMS servers, SAF agents, or path services. Within a partitionable environment, stores in a partition explicitly inherit the targeting of the partition. Files for custom file stores within a partition are located in the system directory of the partition by default. A file store uses the top directory of the current partition as the base directory for relative paths.

A replicated store stores data in local node memory (e.g., Exalogic local node memory) and replicates it to memory on a second node providing high availability. JMS uses a replicated store to persist data to a daemon cluster using configuration information. A region in a daemon cluster corresponds to a file store file or JDBC store table and the name of the region includes the partition name. File names for custom replicated stores within a partition include a partition name in their directory path. Custom replicated stores require a dedicated separate NFS mount and do not use the partition file system for the application server. Configuring a replicated store in a resource group template and/or resource group is not permitted and migrating an existing domain configuration that contains replicated stores to a partitionable, multi-tenant environment will fail.

A JDBC store is a JDBC-accessible database for storing subsystem data, such as persistent JMS messages and durable subscriber information. JDBC stores require administrators to configure a data source JNDI name. A JDBC store obtains a partitioned data source from its partition's JNDI. This means they will implicitly place their tables in its partition's backing database. The JDBC store looks up a data source into JNDI. The partition ID is on the thread when store life-cycle callbacks is called upon from deployment runtime. The JDBC store creates the initial context using the deployment thread in order to ensure that these entities are bound into the correct JNDI name-space.

Certain components configure and instantiate internal file or JDBC stores that are used solely by that component. Examples of this included diagnostic file stores, JMS server file-based paging stores, and JTA transaction log-in-database (TLOG-in-DB) stores. The corresponding application server components that own each of these internal stores determine the scope of these stores.

Each partition can designate a special separate root directory for temporary files, allowing temporary files in a different directory than transactional files for performance and scalability reasons. Examples of temporary files include JMS server paging files, and custom file stores in direct-write-with-cache mode that create cache files.

Store components use system and default work managers in various places. In accordance with an embodiment, work managers are associated with partitions, including system and default work managers. Partition administrators can optionally override work managers configuration for their own partitions. For partition scoped store components, partition-specific work managers are used when possible.

Default file stores and custom stores instances are also JTA XAResources. JTA are mostly non-partitioned, except that default transaction timeouts for JTA are settable at the partition level and runtime diagnostics can filter by tenant. Partitioned XAResource names are decorated with the appropriate partition name. The store XAResource name is constructed based on the store MBean name, and the MBean name of a partitioned store are decorated with the partition name by OA&M. If MBeans names are not unique per partition, additional code is added to ensure that the resource name is decorated with partition name.

Administrators can monitor store runtime statistics, and perform runtime operations via store runtime MBeans. For partition-scoped store instances, the runtime MBeans can be created and registered with the admin server in the context of a partition. To correctly partition runtime MBeans, a store can register top level MBeans (e.g., PersistentStoreRuntime) at the partition root of the runtime MBean hierarchy.

Store components write log messages into server and domain log files. In a partitionable, multi-tenant environment, the current partition of the store component is reported in partitioned component log messages by default. The logging framework ensures that this happens automatically based on the partition ID of the current thread. For partitioned component log messages that should not be exposed to a partition admin, an "exclude_partitioned" attribute in the catalog entry of the log message is set.

Store components use the timer service for various timeout and periodical operations. In accordance with an embodiment, if a timer is created within a scope of a partition, when the timer fires the execute thread it will have the right partition ID in the callback.

A partitionable, multi-tenant environment can enable partition migration from one cluster to another. However, partition migration can be problematic for store component state, with application data possibly being trapped in an old location. In accordance with an embodiment, store components can be prevented from participating in live or soft migration of an active partition, reducing a risk of double booting the same stores in two different places, which may result in data corruption.

A partitionable, multi-tenant environment can also enable importing and exporting of partitions from one domain to another. In accordance with an embodiment, store configuration artifacts within a partition can participate in an import and/or an export, however, persistent data will not.

A file store can participate in partition resource management resource usage tracking by ensuring that all of its threads have the correct component invocation context (CIC) for its partition, but will prevent itself from being subject to recourses that could cause an arbitrary open/write/read call to throw an exception.

UOO Message Routing

The UOO message routing feature is a popular proprietary WL JMS extension that ensures that messages with the same UOO are processed exactly in their original send ordering one-at-a-time regardless of the number of consumers on a destination, regardless of machine, process, transaction, or application failures during messaging, and regardless of whether the destination is actually a logical "distributed" destination that internally spreads its messages across multiple physical destinations. It also allows parallel processing of messages with different UOOs even if the UOOs are all hosted on the same standalone destination, or the same member of a distributed destination. Finally, it supports both point-to-point queueing use cases as well as one-to-many pub/sub topic use cases. The UOO implementation described herein enhances the performance of UOO message routing while continuing to honor all requirements of the UOO contract.

A typical use case for UOO is ensuring that stock ticker messages are processed in the order they were sent, while still allowing different ticker symbols to be processed in parallel across a cluster. Other use cases include equipment monitoring, the ordered processing of different component transactions of a contract (such as a rental car agreement), ensuring a particular debit bank transaction message is only processed after a corresponding deposit transaction message is processed—or vice-versa, scheduling activity for a hospital bed (1 bed==one UOO, with message-based operations on the bed including "move patient", "make bed", etc—ordering ensures one can't make the bed while the patient is still on the bed!), etc. All of these use cases are in production.

The WL UOO/UOW feature provides a configurable UOO/UOW alternative to the path service routing algorithm called "hash routing". Hash routing works by using a modulo of each UOO string's hash over the member count UOO.hash % n. Hash routing does not have the performance, memory, and load balancing penalties of PS routing. However conventional hash routing requires that the number of members in a distributed destination never changes. To put it another way the conventional hash routing algorithm has no mechanism for scaling because changes to the value n would change the routing for all previously produced but not consumed messages leading to failure of the system to properly route messages.

Message unit-of-order (UOO) extension is an API that can be used to enable a message producer or group of message producers acting as one, to group messages into a single unit that is processed sequentially in the order the messages were created. A unit-of-order can be identified by a name attribute. The name (UOO string) can be provided by either a system or an application. Messages in the same unit-of-order share the same name.

In accordance with an embodiment, a unit-of-order-routing configuration attribute in the UOO extension can control how UOO messages are routed through a distributed destination's members.

In accordance with an embodiment, a particular UOO can only be consumed from a particular distributed destination member, thereby ensuring ordered message consumption for that UOO.

In accordance with an embodiment, a distributed destination is a set of destination members (queues or topics) that are accessible as a single, logical destination to applications. A distributed destination can be referenced by its own JNDI name, and can have members of the set distributed across multiple JMS servers within a JMS cluster, with each destination member belonging to a separate JMS server.

Applications that use distributed destinations are more highly available than applications that use simple destinations because JMS provides load balancing and failover for member destinations of a distributed destination within a JMS cluster.

In accordance with an embodiment a JMS cluster can comprise a plurality of JMS servers provided on an application server cluster. A JMS server is an environment-related configuration entity that acts as management container for JMS queue and topic resources for a specific managed server. As such, a JMS server cluster can be configured in an application sever cluster, with each managed server in the application server cluster associated with one or more JMS servers.

Given a JMS cluster which provides a distributed destination with multiple members M-1 to M-n distributed throughout the cluster, wherein "n" is the distributed destination member count. In the JMS cluster, some distributed destination members are running, while some are not, and new distributed destination members may be added over time if a scale-up is needed. Alternatively the number of distributed destination members can be reduced where resource requirements are reduced.

Messages sent to the JMS cluster may be a mix of persistent and non-persistent messages, where persistent messages that have not been processed yet can be restored to their original member after a system failure & restart.

As such, messages for the distributed destination that have the same UOO string needs to be routed to a correct destination to ensure consumption in the a correct order. One way to meet the requirement is to always route messages with the same UOO to the same member in the distributed destination. For example, if a message with UOO String "ORCL" is already queued on a particular member, a new message with the same UOO string can also be routed to the same particular member. A singleton path service within the JMS cluster can be used to centrally track and persist UOO message routes. Members can utilize the path service to determine where to route messages specifying a particular UOO. For a dynamic JMS cluster, the above approach (maintaining a path for each UOO) can be problematic in terms of load balancing, memory usage, and performance.

In accordance with an embodiment, the system and method disclosed herein provides and improved a unit-of-order (UOO) message routing in a dynamic messaging service cluster. A singleton path service creates a first routing table for the cluster, and a second routing table after the cluster is scaled up or scaled down (scaled). Each routing table has a fixed size, and includes a route for each value derived from a modulo operation applied to a hash of each UOO string over a member count of the cluster. The first routing table is used to route messages before the scaling-up (or down), and the second routing tables is used to route messages after the scaling-up (or down). If messages in a UOO are routed to a first member and a second member due to the use of different routing tables, the singleton path service pauses message consumption at the second member until message consumption at the first member is completed. This ensures the UOO is processed (consumed) in order even during rebalancing from one member to another member. The first routing table can be deleted when all messages routed using the first routing table are consumed. Accordingly the first and second routing tables only exist concurrently during a transition period which allows for consumption of all messages routed using the first routing table.

In accordance with an embodiment, each value in the first routing table and the second routing table can be hash modulo of a UOO string that is calculated using the formula "UOO.hash % X", where UOO.hash is the hash of a UOO string, and X is the number of total members in a cluster. The number of total members in the cluster can be dynamically calculated. For example, instead of persisting a path for each named UOO—the system persists a path for the modulo of each UOO. In a preferred embodiment, the modulo selected is 1024, accordingly only 1024 paths need to be persisted no matter how many named UOOs are in use. Preferably the number selected for the modulo function is substantially greater than the number of destination members. For example, alternative modulos may be used including but not limited to 128, 256, 512, and 2048).

The system hashes the UOO of received messages and takes the modulo of the hash. Messages whose hashed UOO have the same modulo are routed to same location as provided in the path table. The system takes advantage of the fact that the hash/modulo function is fairly randomly distributed (otherwise might be uneven loading). In practice UOO names are sufficiently random such that even distribution of the UOOs over the range of destination is not sacrificed. After the system has established all the routes (1024) there is no additional performance penalty. Subsequent messages just find their path in the table when it is fully populated.

When new member added to cluster—the system creates a new routing table for new destinations/message. The system continues to honor old routes for old messages. New messages route to new locations distributed over all members. But processing of new messages at new locations is paused until all messages at old locations have finished processing. In accordance with an embodiment, when a new member is added to the cluster, and since the new member is initially not associated with any UOO, no incoming messages are routed to the new member. However, the path service creates a second (new) routing table to record new routes for modulo'd hashes of UOO strings. Because the number of members has changed in the scaled-up cluster, the number of routes also changes. As new messages arrive having particular UOOs, the path service routes the new messages to new destinations and populates the new routing table. Accordingly the new routing table distribute messages to all members of the cluster (including the new member).

In accordance with an embodiment, consumption of messages for a UOO at a new destination is paused until all messages at a prior destination for the UOO have been consumed. When all messages have been consumed from the old destination for the UOO, consumption of messages from the new destination for UOO is activated. The first/existing routing table is maintained until all old destinations have been drained of messages. The existing routing table is retired when all old destinations have been drained of messages. Income messages are routed using the new routing table.

Figure 7:
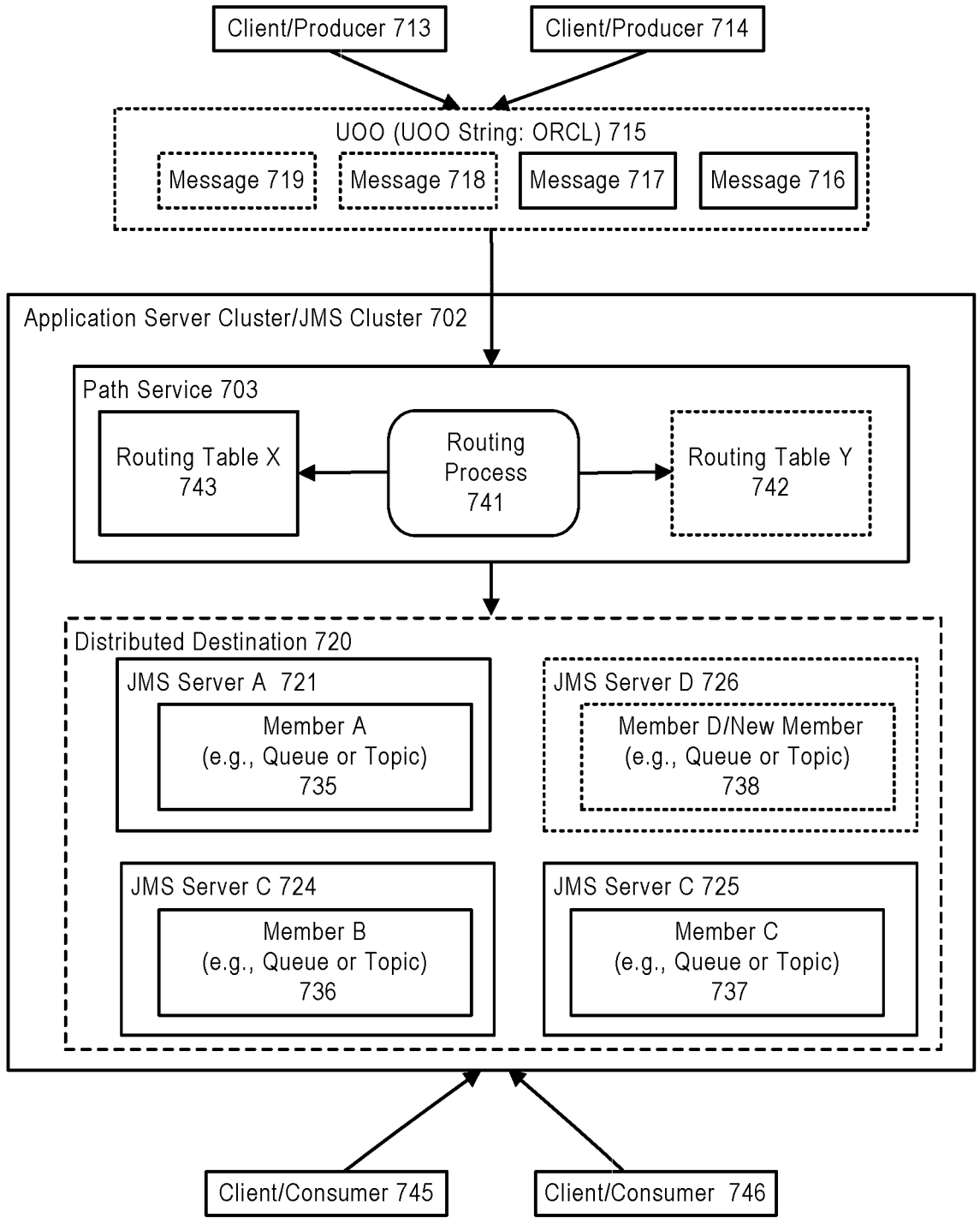
FIG. 7 illustrates a system for unit-of-order message routing in a dynamic messaging service cluster, in accordance with an embodiment.

FIG. 7 illustrates a system for unit-of-order message routing in a dynamic messaging service cluster, in accordance with an embodiment.

As shown in FIG. 7, a UOO 715 with a UOO string "ORCL" can include messages 716, 717, 718, and 719 from a plurality of client applications/producers 713, 714. The UOO can be received at an application server cluster 702, which can provide a messaging service cluster (e.g., JMS cluster) with a plurality of messaging service servers, for example, JMS server A 721, JMS server B 724, and JMS server C 725.

As further shown in FIG. 7, a distributed destination 720 provided in the messaging service cluster can include a set of destination members (queues or topics) 735, 736, and 737 that are accessible as a single, logical destination to producers 713, 714 and consumers 745, 746. The set of destination members can be distributed across the plurality of messaging service servers. As such, in this particular example, the number of JMS servers in the cluster can be equal to the number of destination members.

In accordance with an embodiment, a path service 703 can include a fixed-sized routing table X 743 that includes routes, each route corresponding to a value derived from a modulo operation applied to a hash of one or more UOO strings over a member count of the cluster. The path service can be implemented as a singleton service which persists its data (e.g., routing table X 743) to either a file system or a database table based on configuration.

As an illustrative example, a hash function can be used to take a UOO string (e.g., ORCL) as input, process the string four bytes at a time, and interpret each of the four-byte chunks as a single long integer value. The hash function can add the integer values for the four-byte chunks to get a resulting sum. The resulting sum can be converted into a value using the modulo operation "resulting sum % member count of the cluster".

In accordance with an embodiment, the path service can record the value in routing table X together with a route for a cluster member. As such, instead of recording a route for each individual UOO string, the path service can record a route for a modulo of a UOO string's hash (UOO.hash % X). Messages with the same modulo are routed to the same member. Once a routing table is fully populated, there would be no additional performance penalty. Subsequent messages can find their routes in the routing tables.

In accordance with an embodiment, a modulo as used herein is a remainder of a hash of a UOO string divided by a member count of the cluster, and is a value associated with a route recorded in a routing table.

Using the above approach, the path service can evenly distribute UOOs across the set of destination members in the cluster, since a hash will not change for any particular string, different UOO strings have different hashes that are randomly distributed among the different UOO strings, and X does not change at least for a period of time (for example, when the cluster is in a steady state).

In accordance with an embodiment, when a new destination member D 737 on JMS server D 723 is added to the cluster, a new routing table (e.g., routing table Y 742) can be created by the path service, which can use the member count of the scaled-up cluster to calculate modulos of UOO strings, and record routes for the modulos. UOO messages received after the addition of the new member are routed across the scaled-up cluster using the new routing table.

In accordance with an embodiment, for a UOO that has its first message sent to the cluster after the cluster is scaled up with the new member, the path service can use the new routing table to route messages in the UOO to a particular member in the scaled-up cluster based on the calculated modulo of a string of the UOO.

However, for a UOO that has one or more messages sent to the cluster before the cluster is scaled up with the new member, messages in the UOO can be split between the new member (member D 738) and another member (e.g., member C 737) in the cluster.

Since the UOO needs to be consumed from a particular distributed destination member by producers to ensure ordered message consumption for that UOO, the path service can pause consumption of post-split messages (e.g., message 718 and message 719) at the new member by one or more of the consumers 745, 746 while allowing the producers to consume or drain the one or more pre-split messages (e.g., message 716 and message 717) at member C.

When all the pre-split messages in the UOO are consumed at the member C, the path service can unpause the consumption of the post-split messages in the UOO. Once consumption of post-split messages for all split-UOOs are unpaused, the path service can retire (delete) the old routing table (e.g., routing table X), and use the new routing table (e.g., routing table Y) as the only routing table for the cluster.

In accordance with an embodiment, UOO message routes can be cached throughout the cluster to minimize the need to contact the path service to get information on established routes.

In accordance with an embodiment, UOO message routes can be maintained using a central database table or file that is directly accessed by the members in the cluster, instead of indirectly accessed via the path service.

Figure 8A:
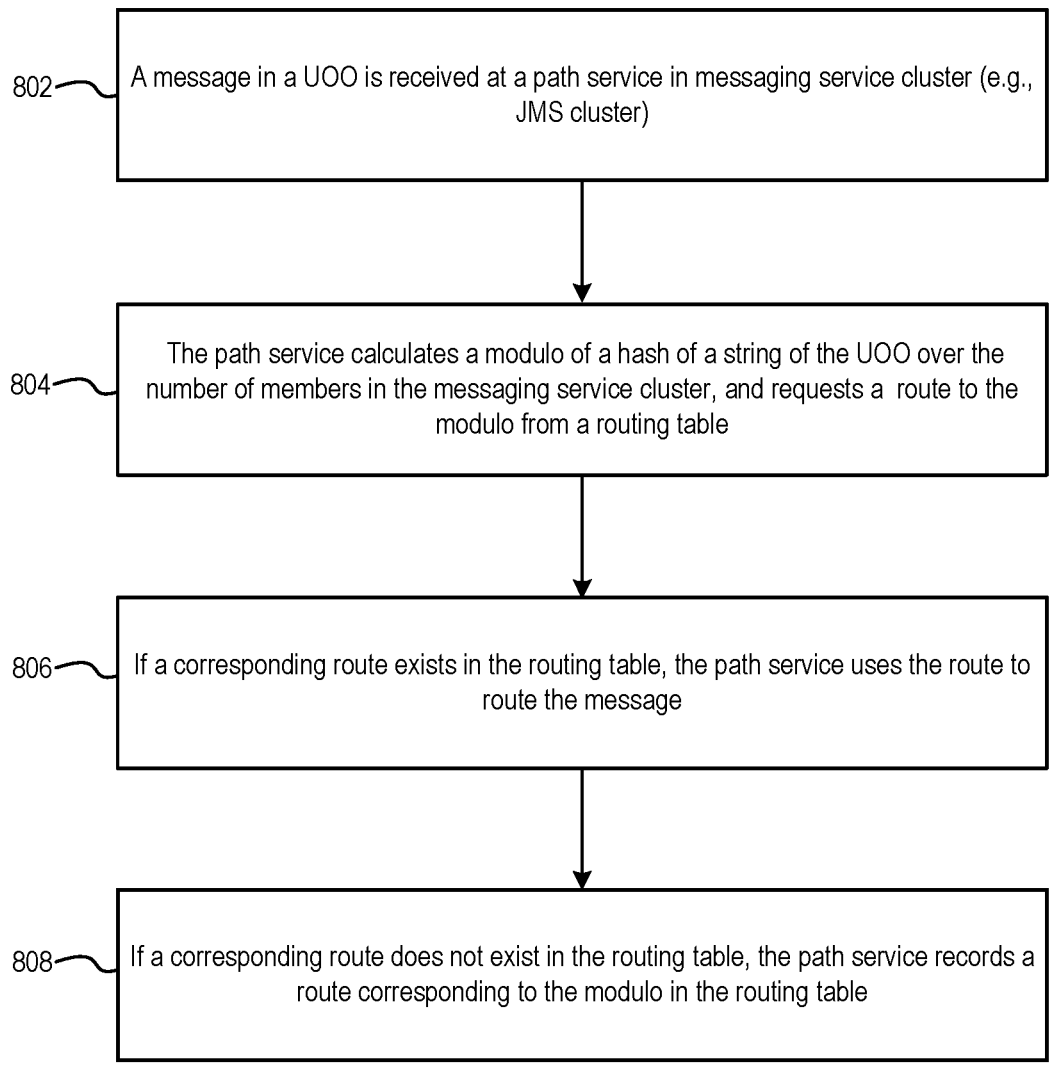
FIG. 8A illustrates a process for routing UOO messages to a dynamic messaging service cluster, in accordance with an embodiment.

FIG. 8A illustrates a process for routing UOO messages to a dynamic messaging service cluster, in accordance with an embodiment.

In accordance with an embodiment, the routing process described by this figure can be used to route UOO messages to a messaging service cluster that is in a steady state.

As shown by the figure, at step 802, a message in a UOO is received at a path service in messaging service cluster (e.g., JMS cluster).

At step 804, the path service calculates a modulo of a hash of a string of the UOO over the number of members in the messaging service cluster, and requests a route corresponding to the modulo from a routing table.

At step 805, if a corresponding route exists in the routing table, the path service uses the route to route the message.

At step 806, if a corresponding route does not exist in the routing table, the path service records a route corresponding to the modulo in the routing table.

At step 807, the path service uses the newly recorded route to route the message.

Figure 8B:
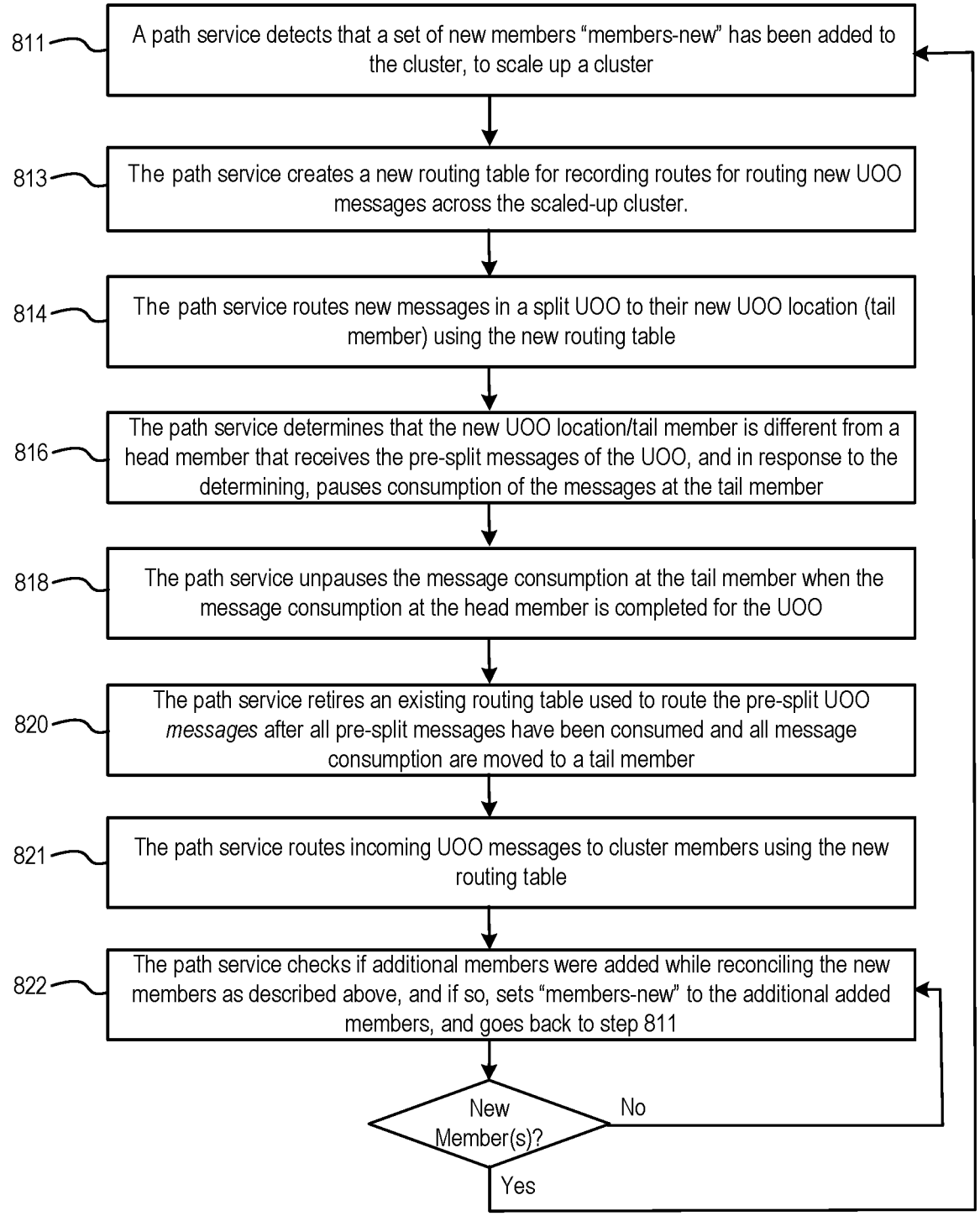
FIG. 8B further illustrates a process for routing UOO messages to a dynamic messaging service cluster, in accordance with an embodiment.

FIG. 8B further illustrates a process for routing UOO messages to a dynamic messaging service cluster, in accordance with an embodiment.

In accordance with an embodiment, the routing process described by this figure can be used to route UOO messages to a messaging service cluster that is not in a steady state. A cluster in such a state can be a cluster that is scaled up with one or more new members. When one or more messages in a UOO are received at the cluster after the cluster is scaled up, and one or more messages in the UOO are received at the cluster after the cluster is scaled up, messages in the UOO can be routed to two different members, thus creating a split UOO. The member that receives the pre-split messages of the UOO is the head member, and the other member is the tail member.

In accordance with an embodiment, as shown by the FIG. 8B, at step 811, the path service detects that a set of new members "members-new" has been added to the cluster to scale up the cluster. At step 813, the path service can create a new routing table for recording routes for routing new UOO messages across the scaled-up cluster. Each route in the new routing table corresponds to a value calculated by applying a modulo operation to a hash of a UOO string over the member count (X) in the scaled-up cluster. The new routing table can be a map or an array with an length equivalent to the member count in the scaled-up cluster. Further, each route in the new routing table can track which particular member is the head and which member is the tail. A head member can be a member which pre-split UOO messages were routed to, and a tail member can be a member which post-split UOO messages are to be routed to.

At step 814, the path service routes new messages in a split UOO to their new UOO location (tail member) using the new routing table. At step 816, the path service determines that the new UOO location/tail member is different from a head member that receives the pre-split messages of the UOO, and in response to the determining, pauses consumption of the messages at the tail member. At step 818, the path service unpauses the message consumption at the tail member when the message consumption at the head member is completed for the UOO.

At step 820, the path service retires an existing routing table used to route the pre-split UOO messages after all pre-split messages have been consumed and all message consumption are moved to a tail member. At step 821, the path service routes incoming UOO messages to cluster members using the new routing table. At step 822, the path service checks if additional members were added while reconciling the new members as described above, and if so, sets "members-new" to the additional added members, and goes back to step 811.

In accordance with an embodiment, with a more complex routing table, one or more of the optimizations/enhancements are implemented. In one optimization routes are cached throughout the cluster to minimize the need to contact the path service to get information on established routes.

In another optimization, the retirement of a member that may have a message backlog is handled without losing any messages. For example, the tail of a UOO can be moved to another member while the head messages of the UOO are being processed and drained without accepting any new messages, and the member to be retired is removed once all head messages are processed.

In another optimization, recovery from destruction/corruption of the path service persisted data is provided by reconstructing the path service data based on member data. Moreover recovering from destruction/corruption of member data can be achieved by reconstruction based on the path service persisted data.

In another optimization, Waking up (unpausing) an individual migrated UOO is performed as soon as all messages on its head are processed, instead of waiting for all UOO heads with the same 'hash % X' to finish processing before unpausing their tails.

In another optimization, the number of routes that are moved when a new member is added to the cluster is minimized.

In another optimization UOO route maintenance is distributed among multiple path services, instead of one singleton path service.

In another optimization path routes are maintained in a central DB table or file that is directly accessed by members, instead of indirectly via a singleton path service.

In another optimization, the system and method provided for handling a series of scaling actions instead of just one at a time, by for example, maintaining multiple routing tables instead of just two, and corresponding routes in each table for each UOO hash for the hash's "head", "middle" sections and tail. Particular routing tables are maintained until all messages routed using the table have been consumed, at which the routing table is deleted.

Figure 9:
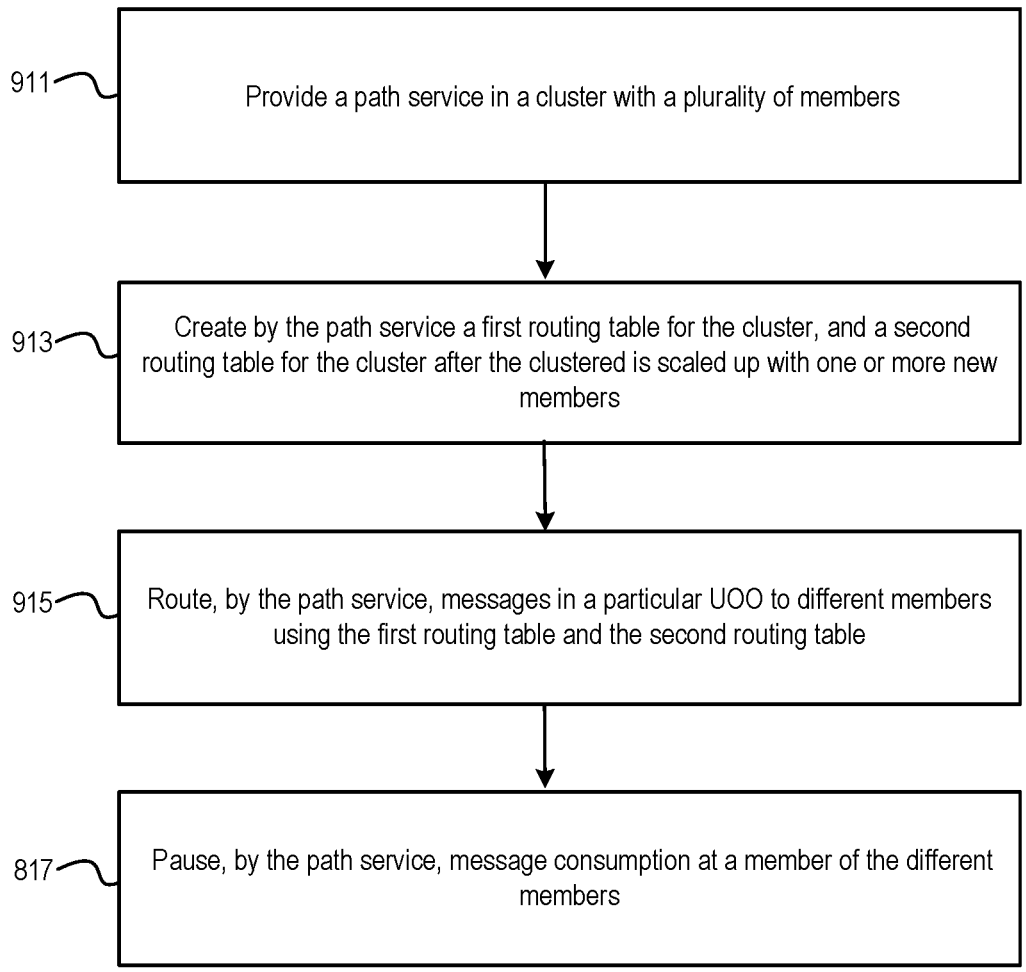
FIG. 9 illustrates a method for unit-of-order message routing in a dynamic messaging service cluster, in accordance with an embodiment.

FIG. 9 illustrates a method for unit-of-order message routing in a dynamic messaging service cluster, in accordance with an embodiment. As shown in FIG. 9, at step 911, a path service is provided in a cluster with a plurality of members. At step 913, the path service creates a first routing table for the cluster, and a second routing table for the cluster after the clustered is scaled up with one or more new members. At step 915, the path service routes messages in a particular UOO to different members using the first routing table and the second routing table. At step 917, the path service pauses message consumption at a member of the different members.

While various embodiments of the present invention have been described above, it should be understood that they have been presented by way of example, and not limitation. The embodiments were chosen and described in order to explain the features and principles of the invention and its practical application. The embodiments illustrate systems and methods in which the various features of the present invention are utilized to improve the performance of the systems and methods by providing new and/or improved functions, and/or providing performance advantages including, but not limited to, reduced resource utilization, increased capacity, increased throughput, improved efficiency, reduced latency, enhanced security, and/or improved ease of use.

Some embodiments of the present invention are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function. In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present invention are implemented in a computer including a processor, a computer-readable storage medium, and a network card/interface for communicating with other computers. In some embodiments, features of the present invention are implemented in a network computing environment comprising a computing system including various types of computer configurations, including personal computers, hand-held devices, multi-processor systems, microprocessor-based or programmable consumer electronics, network PCs, mini-computers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present invention are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the invention are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present invention are implemented in the cloud as part of, or as a service of, a cloud computing system based on shared, elastic resources delivered to users in a self-service, metered manner using Web technologies. Characteristics of the cloud may include, for example: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention are implemented by circuitry that is specific to a given function. In other implementations, features are implemented in a computer, computing system, processor, and/or network, configured to perform particular functions using instructions stored e.g. on a computer-readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present invention includes a computer program product which is a machine-readable or computer-readable storage medium (media) having instructions comprising software and/or firmware stored thereon/in, which instructions can be used to program or otherwise configure a system such as a computer to perform any of the processes or functions of the present invention. The storage medium or computer readable medium can include any type of media or device suitable for storing instructions and/or data including, but not limited to, floppy disks, hard drives, solid state drives, optical discs, DVD, CD-ROMs, microdrives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the invention to the precise forms disclosed. Additionally, where embodiments of the present invention have been described using a particular series of transactions and steps, it should be apparent to those skilled in the art that, unless stated, the embodiment does not exclude performance of additional transactions and steps. Further, while the various embodiments describe particular combinations of features of the invention it should be understood that different combinations of the features will be apparent to persons skilled in the relevant art as within the scope of the invention. In particular, a feature (device-like or method-like) recited in a given embodiment, variant, or shown in a drawing may be combined with or replace another feature in another embodiment, variant or drawing, without departing from the scope of the present invention. Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the invention. It is intended that the broader spirit and scope of the invention be defined by the following claims and their equivalents.

What is claimed is:

1. A system for supporting unit-of-order (UOO) messaging in an application server environment, comprising:
a cluster having a first member count of cluster members, wherein the cluster is scaled to have a second member count of cluster members;
wherein each cluster member comprises an application server operating on a computer comprising a processor and memory, and wherein each cluster member is connected to each other cluster member by a network;
a path service in the cluster;
wherein the path service creates a first routing table for the cluster which includes routes for UOO which correspond to a value calculated by a modulo operation applied to a hash of a UOO string over the first member count;
wherein the path service creates a second routing table for the scaled cluster which includes routes for UOO which correspond to a value calculated by a modulo operation applied to a hash of a UOO string over the second member count;

wherein when messages in a particular UOO are routed to different members by the path service using the first routing table and the second routing table, the path service operates to pause message consumption at a member of the different members.

2. The system of claim 1, wherein the different members includes a first member in the original cluster, and a second member in the scaled cluster, and wherein the member where message consumption is paused is the second member.

3. The system of claim 1, wherein the second member count is greater than the first member count.

4. The system of claim 1, wherein the paused message consumption is unpaused when message consumption for the particular UOO is completed at another member.

5. The system of claim 1, wherein the path service deletes the first routing table after messages routed using the first routing tables are consumed.

6. The system of claim 1, wherein each of the plurality of members in the cluster is a queue or a topic.

7. The system of claim 1, wherein the cluster is a Java Message Service (JMS) cluster.

8. The system of claim 1, wherein the plurality of members in the cluster is provided in a distributed destination.

9. The system of claim 1, wherein the path service is a singleton service.

10. A method for supporting unit-of-order (UOO) messaging in an application server environment, comprising:
    providing a path service in a cluster having a first member count of cluster members, wherein the cluster is scaled to have a second member count of cluster members, wherein,
        the path service creates a first routing table for the cluster, wherein the first routing table includes routes for UOO messages, wherein each of the routes in the first routing table corresponds to a value calculated by a modulo operation applied to a hash of a UOO string over the first member count, and
        the path service creates a second routing table for the cluster after the clustered is scaled, wherein the second routing table includes routes for UOO messages, wherein each of the routes in the second routing table corresponds to a value calculated by a modulo operation applied to a hash of a UOO string over the second member count;
    routing, by the path service, messages in a particular UOO to different members using the first routing table and the second routing table; and
    pausing, by the path service, message consumption at a member of the different members.

11. The method of claim 10, wherein the different members includes a first member in the original cluster, and a second member in the scaled cluster, and wherein the member where message consumption is paused is the second member.

12. The method of claim 10, wherein the second member count is greater than the first member count.

13. The method of claim 10, wherein the paused message consumption is unpaused when message consumption for the particular UOO is completed at another member.

14. The method of claim 10, wherein the path service deletes the first routing table after messages routed using the first routing tables are consumed.

15. The method of claim 10, wherein each of the plurality of members in the cluster is a queue or a topic.

16. The method of claim 10, wherein the cluster is a Java Message Service (JMS) cluster.

17. The method of claim 10, wherein the plurality of members in the cluster is provided in a distributed destination.

18. The method of claim 10, wherein the path service is a singleton service.

19. A non-transitory computer-readable storage medium storing a set of instructions for supporting unit-of-order (UOO) messaging in an application server environment, said instructions, when executed by one or more processors, causing the one or more processors to perform steps comprising:
    providing a path service in a cluster having a first member count of cluster members, wherein the cluster is scaled to have a second member count of cluster members, wherein,
        the path service creates a first routing table for the cluster, wherein the first routing table includes routes for UOO messages, wherein each of the routes in the first routing table corresponds to a value calculated by a modulo operation applied to a hash of a UOO string over the first member count, and
        the path service creates a second routing table for the cluster after the clustered is scaled, wherein the second routing table includes routes for UOO messages, wherein each of the routes in the second routing table corresponds to a value calculated by a modulo operation applied to a hash of a UOO string over the second member count;
    routing, by the path service, messages in a particular UOO to different members using the first routing table and the second routing table; and
    pausing, by the path service, message consumption at a member of the different members.

20. The non-transitory computer-readable storage medium of claim 19, wherein the different members includes a first member in the original cluster, and a second member in the scaled cluster, and wherein the member where message consumption is paused is the second member.

* * * * *